US010608328B2

(12) United States Patent
Sabatino et al.

(10) Patent No.: US 10,608,328 B2
(45) Date of Patent: Mar. 31, 2020

(54) LIGHT WEIGHT SYSTEM TO LOCATE ENEMY ARTILLERY, MORTAR, AND ROCKET FIRE

(71) Applicant: SRC, Inc., North Syracuse, NY (US)

(72) Inventors: Mark T. Sabatino, Jamesville, NY (US); Thomas Wilson, Fayetteville, NY (US)

(73) Assignee: SRC, Inc., North Syracuse, NY (US)

( * ) Notice: Subject to any disclaimer, the term of this patent is extended or adjusted under 35 U.S.C. 154(b) by 350 days.

(21) Appl. No.: 15/631,697

(22) Filed: Jun. 23, 2017

(65) Prior Publication Data

US 2017/0373380 A1    Dec. 28, 2017

Related U.S. Application Data

(60) Provisional application No. 62/354,260, filed on Jun. 24, 2016.

(51) Int. Cl.
| | | |
|---|---|---|
| *G01S 13/08* | (2006.01) | |
| *H01Q 1/24* | (2006.01) | |
| *H01Q 1/12* | (2006.01) | |
| *H01Q 1/42* | (2006.01) | |
| *H01Q 21/20* | (2006.01) | |
| *H01Q 1/27* | (2006.01) | |
| *G01S 13/88* | (2006.01) | |
| *H01Q 1/38* | (2006.01) | |

(52) U.S. Cl.
CPC ............. *H01Q 1/247* (2013.01); *G01S 13/08* (2013.01); *G01S 13/88* (2013.01); *H01Q 1/1235* (2013.01); *H01Q 1/273* (2013.01); *H01Q 1/38* (2013.01); *H01Q 1/427* (2013.01); *H01Q 21/205* (2013.01)

(58) Field of Classification Search
CPC ....... G01S 13/08; G01S 13/88; H01Q 1/1235; H01Q 1/247; H01Q 1/427; H01Q 1/273; H01Q 1/38; H01Q 21/205
See application file for complete search history.

(56) References Cited

U.S. PATENT DOCUMENTS

| | | | |
|---|---|---|---|
| 7,248,210 B2 | 7/2007 | Bruce et al. | |
| 8,253,638 B2 * | 8/2012 | Siemsen | H01Q 1/08 343/726 |
| 10,050,342 B1 * | 8/2018 | Hall | G01S 7/02 |

(Continued)

FOREIGN PATENT DOCUMENTS

| | | |
|---|---|---|
| DE | 20 2005 011493 | 12/2005 |
| DE | 10 2005 018969 | 11/2006 |

OTHER PUBLICATIONS

International Search Report Form PCT/ISA/220, International Application No. PCT/US2017/039047, pp. 1-13, dated Dec. 15, 2017.

*Primary Examiner* — Timothy X Pham
(74) *Attorney, Agent, or Firm* — Bond Schoeneck & King, PLLC; George McGuire (57) ABSTRACT

A portable radar system is disclosed including a mast, a fabric enclosure being sized and dimensioned to be extendable in a covering relation with at least part of the mast; and an antenna comprising at least one element, wherein said antenna is arranged on the fabric enclosure and is positioned to illuminate or receive reflections from a target when the fabric enclosure is in a covering relation with the mast and the mast is deployed.

11 Claims, 6 Drawing Sheets

(56) References Cited

U.S. PATENT DOCUMENTS

| | | | |
|---|---|---|---|
| 2011/0221646 A1* | 9/2011 | Dresel | H01Q 1/08 343/792.5 |
| 2015/0333391 A1* | 11/2015 | Pryor | H01Q 1/08 343/718 |
| 2017/0025745 A1* | 1/2017 | Clayton | H01Q 15/161 |
| 2017/0310013 A1* | 10/2017 | Muesse | H01Q 1/273 |

* cited by examiner

LIGHT WEIGHT SYSTEM TO LOCATE ENEMY ARTILLERY, MORTAR, AND ROCKET FIRE

CROSS-REFERENCE TO RELATED APPLICATIONS

The present application claims priority to and the benefit of U.S. Provisional Patent Application No. 62/354,260, filed on Jun. 24, 2016, the entire contents of which are hereby incorporated by reference.

GOVERNMENT FUNDING

This invention was made with Government support under US Government RFI # N0016413SNB02. The United States Government has certain rights in the invention.

FIELD OF INVENTION

The present invention is directed to radar systems and, more particularly, to portable radar systems.

BACKGROUND

Counter-mortar radar systems are widely used in combat situations to immediately locate and return fire on sites from which mortars are being fired. To protect sites that must be deployed as well as moved quickly, counter-mortar radar systems must be lightweight, easily transportable, and easily configured. Many of the current systems are heavy, vehicle-mounted, or require a prolonged assembly period. Accordingly, there is a need in the art for lightweight, quickly-deployed counter mortar radar that may be transported, deployed, operated by a single user.

SUMMARY

This need in the art is addressed by a lightweight portable radar system including a collapsible fabric enclosure including at least one antenna element. In an embodiment, the portable radar system may further include a collapsible mast to which the fabric enclosure may be attached.

According to an aspect, a portable radar system includes a fabric enclosure being sized and dimensioned to be extendable in a covering relation with at least part of the mast; and an antenna comprising at least one element, wherein said antenna is arranged on the fabric enclosure and is positioned to illuminate or receive reflections from a target when the fabric enclosure is in a covering relation with the mast and the mast is deployed.

According to an embodiment, the mast is collapsible.

According to an embodiment, the mast is collapsible by rolling.

According to an embodiment, the portable radar system further includes a plurality of tethers, each tether being configured to be mounted at a first end to the mast and at a second end to a surface lower than the first end.

According to an embodiment, the fabric enclosure defines a plurality of channels, each being sized to receive a respective tether of the plurality of tethers.

According to an embodiment, a plurality of poles, each pole being configured to be mounted at a first end to the mast and at a second end to a surface lower than the first end, such that the poles form a frame about the mast.

According to an embodiment, the portable radar system further includes a plurality of outriggers, each of the plurality of outriggers extending radially from the mast.

According to an embodiment, the plurality of outriggers each provide a surface for mounting a respective second end of each tether of the plurality of tethers.

According to an embodiment, the fabric enclosure is configured to form a plurality of planes, each plane including at least one antenna element.

According to an embodiment, each plane of the plurality of planes is substantially trapezoidal.

According to an embodiment, the fabric enclosure is substantially conical when in a covering relation with said mast.

According to an embodiment, the portable radar system further includes a base configured to retain the mast in a substantially upright position.

According to an embodiment, the at least one antenna element is arranged on the fabric enclosure as an eTextile.

According to an embodiment, the portable radar system further includes a processor (24) configured to receive signals received by the at least one antenna element.

A portable radar system, comprising: a mast; and a fabric substrate being mounted to the mast, the fabric substrate including an antenna comprising at least one element, wherein said antenna is arranged on the fabric substrate and is positioned to illuminate or receive reflections from a target when the fabric substrate is mounted to the mast.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
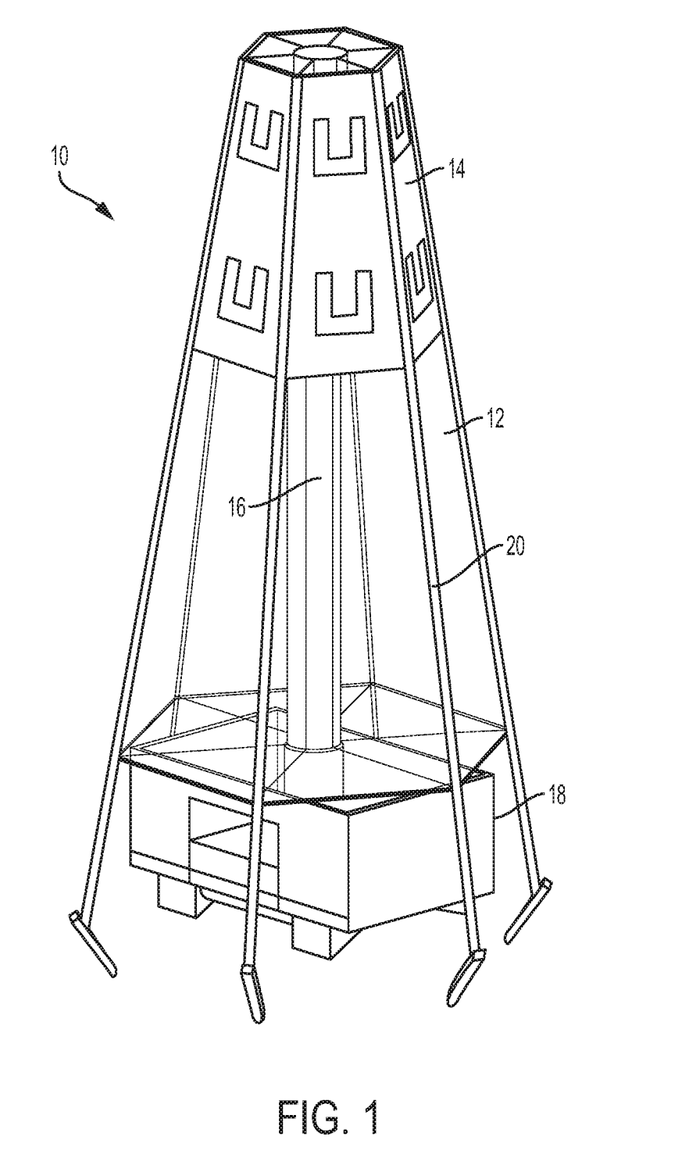
FIG. 1 shows a perspective view of a portable radar system, according to an embodiment.
Figure 2:
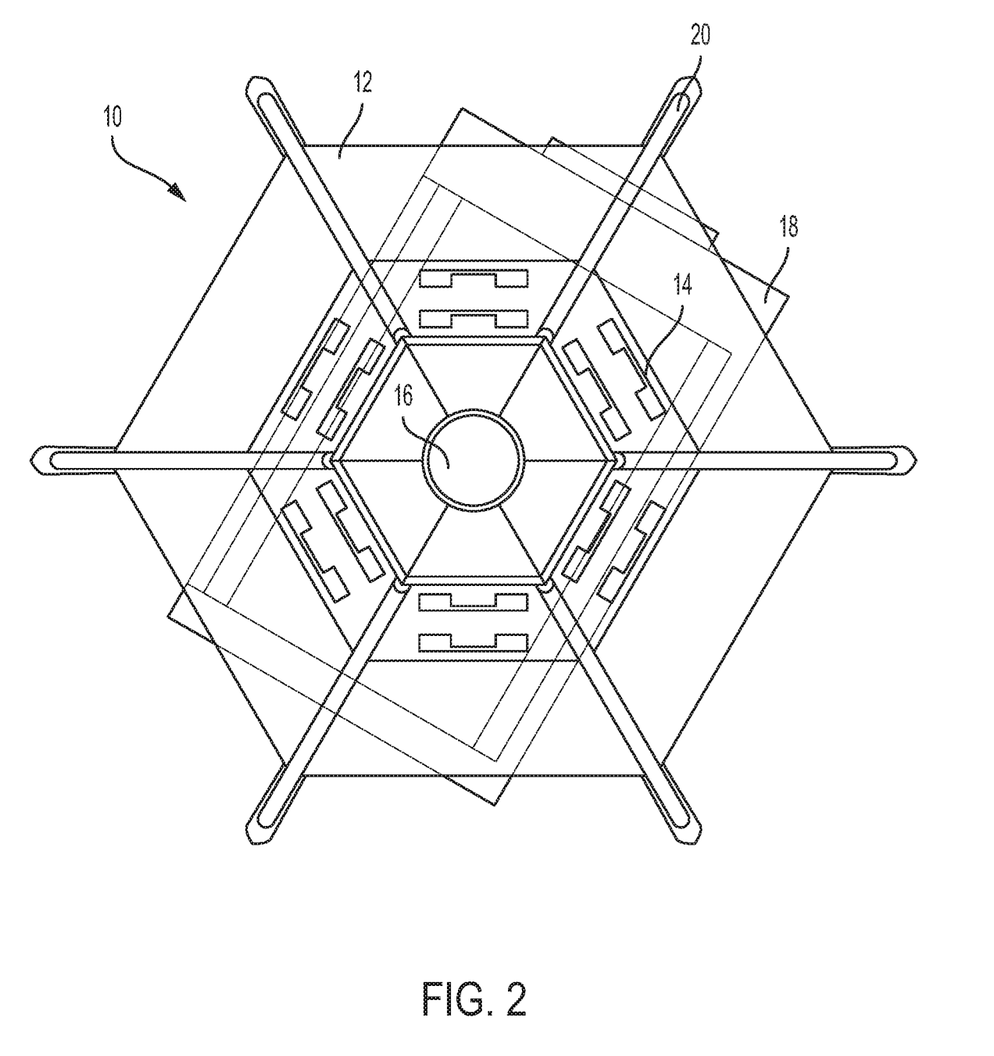
FIG. 2 shows a top view of a portable radar system, according to an embodiment.
Figure 3:
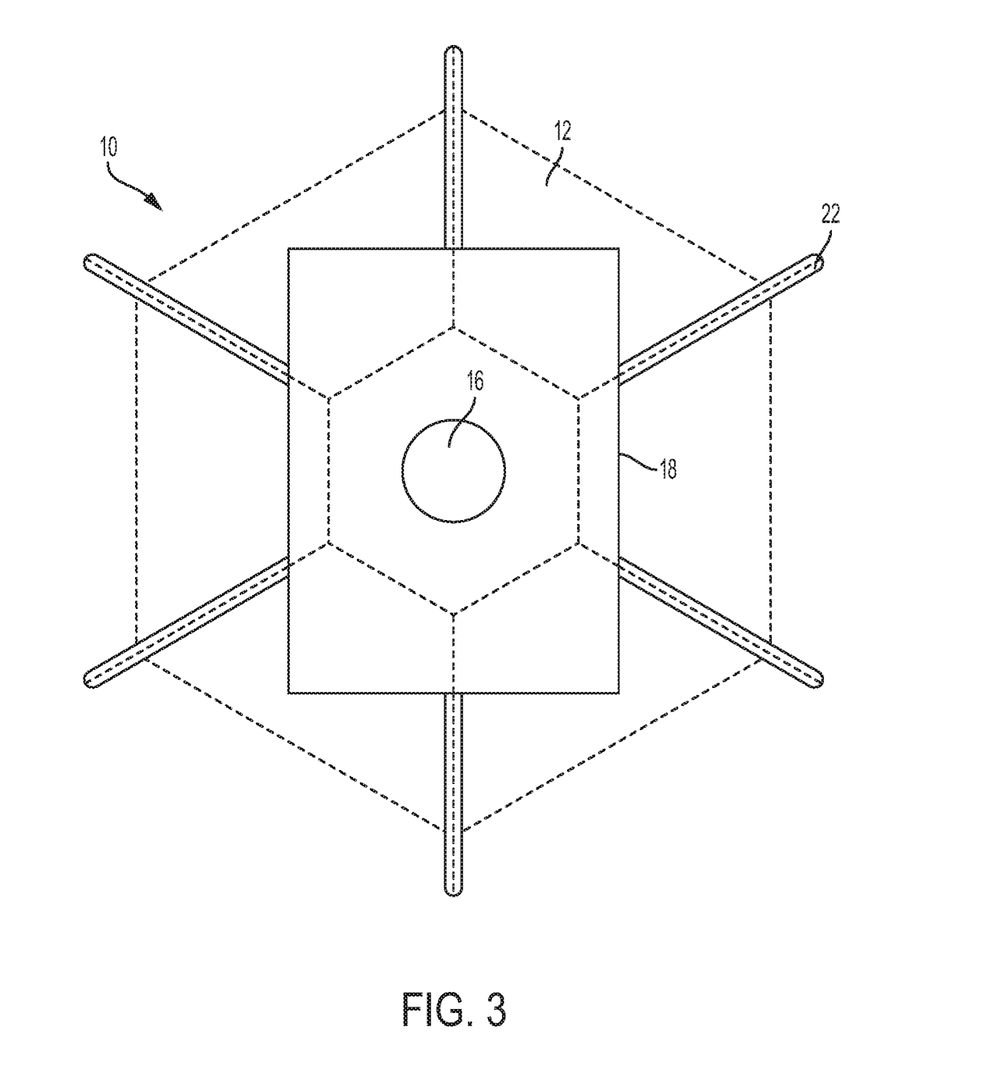
FIG. 3 shows a top view of a portable radar system, according to an embodiment.

Referring now to the drawings, there is shown in FIGS. 1 and 2 a schematic of a portable radar system 10 according to an embodiment. As shown, portable radar system 10 may include a fabric enclosure 12 that may comprise one or more antenna elements 14 configured to transmit and/or receive radar signals. The antenna elements 14 may be arranged on fabric enclosure 12 such that fabric enclosure 12 may be folded in one or more places to allow for easy storage and transportation. Fabric enclosure 12 may be erected about a frame such that the antenna elements 14 of fabric enclosure 12 are advantageously positioned to illuminate, and receive reflections from, an airborne or ground-based target.

Figure 6:
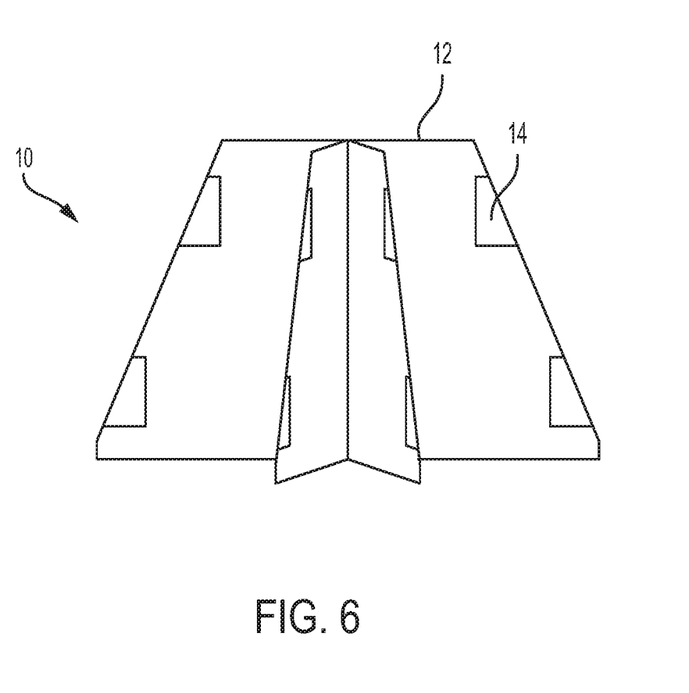
FIG. 6 shows a side view of a portable radar system, according to an embodiment.

Antenna elements 14 may be comprised of any type of elements as are known in the art and suitable for attaching to fabric enclosure 12 and for transmitting and receiving. For example, antenna elements 14 may each be formed from a dipole (as shown in FIG. 6), or, as shown in FIGS. 1 and 2, a patch element. Antenna elements 14 may be integrated directly into the fabric as an eTextile or may be sewn, laminated, glued, or otherwise applied to the surface of fabric enclosure 12. In an embodiment, radar system 10 may include only a single antenna element.

Frame may be configured to collapse, disassemble, or otherwise break down for easy storage and assembly. In an embodiment, as shown in FIG. 1, frame comprises a mast 16. Mast 16 may be stood substantially upright, and may be extendable between various heights. As shown in FIGS. 1 and 2, in an embodiment, mast 16 may extend from a base 18. Base 18 may be a backpack (or other portable container) which can store the collapsed or disassembled parts of portable radar system 10, when radar system 10 is being transported, stored, or is otherwise non-deployed. In an alternate embodiment, base 18 may be a separate base that may itself by collapsed or otherwise detached from mast 16 and stored in a backpack or elsewhere. Mast 16 may be collapsible so that it may be easily stored and transported. For example, mast 16 may be made from Rolatube— available from Rolatube Technology—with, a 2" diameter (although other diameters may be used), such that a user may roll up mast 16 when system 10 is not deployed.

Mast 16 may also include a plurality of tethers (e.g. nylon ropes, wire ropes, etc.) that extend radially outward from mast 16. Tethers 20 may be connected to ground or another surface. For example, tethers 20 may extend from mast 16 down to ground, where each may be attached with stakes or another fastening implement suitable for attaching tethers 20 to the ground or another surface or feature (e.g., a hook or ring fastened to the ground or floor). In an alternate embodiment, a plurality of outriggers 22 may extend radially outward from mast 16, to which tethers 20 may be fastened. For example, a plurality of outriggers 22 may extend from or near the bottom of mast 16, while a plurality of tethers 20 may extend from a point above the outriggers (e.g. near or at the top of mast 16) and may extend radially out and down from mast 16, attaching to outriggers instead of the ground. In an alternate embodiment, frame may include poles that are rigid or semi-rigid. Such poles may be collapsible or may be disassembled (e.g., like tent poles) for ease of storage and transportation. Poles may be attached like tethers 20 to mast 16, extending radially outward and downward to form a conical frame.

Fabric enclosure 12 may be sized and dimensioned to at least partially fit over frame when deployed. For example, as shown in FIG. 1, fabric enclosure 12 may be sized and dimensioned to fit over collapsible mast and tethers 20 (or poles) to form a generally conical shape. For example, as shown, fabric enclosure 12 may be sized to stretch over collapsible mast 16 and tethers 20 such that enclosure 12 forms a plurality of flat, trapezoidal, planes, with each antenna element embedded in one of the flat planes. One of ordinary skill will appreciate that enclosure 12 may be sized to form any of a number of shapes, according to the shape and configuration of collapsible mast 16 and tethers 20 (or poles) and according to the desired shape of deployed radar system 10. In an embodiment, tethers 20 may not be connected to mast 16, but instead may be interconnected with enclosure 12 (e.g., via channels formed in enclosure 12), and may be deployed and broken down as a single unit. In another embodiment, tethers 20 may be both interconnected with enclosure 12 and connected to mast 16.

To set up system 10, in an embodiment, mast 16 may be erected such that it is substantially upright. Mast 16 may be supported by a base 18. Enclosure 12 may thereafter be slid over mast 16 and tied down using stakes or other fasteners. If tethers 20 are not interconnected with enclosure 12, tethers 20 may first be connected to mast 16 and tied down, whereupon enclosure 12 may be slide over mast 16 and tethers 20 and secured.

System 10 may further comprise a processor 24 that is configured to execute program code to transmit, receive, and/or process signals via antenna elements 14. System 10 may also be configured to consume sufficiently low power to be powered by a battery 26 (e.g. less than or equal to 200 W of total power). System 10 may further include any cables 28 necessary to connect battery 26 to processor 24, processor 24 to antenna elements 14, or any other connections necessary to operate system 10 as will be understood by a person of ordinary skill in the art in conjunction with a review of this disclosure. Processor 24, in an embodiment, may be configured to receive commands from and be operated by a user via a computing device such as a mobile device, or a wrist wearable computer that is hard connected or wirelessly connected to processor 24. In an embodiment, processor may be operated via a screen and/or an input device (e.g., a mouse, keyboard, etc.) that is hard connected or wirelessly connected to processor 24.

Figure 4:
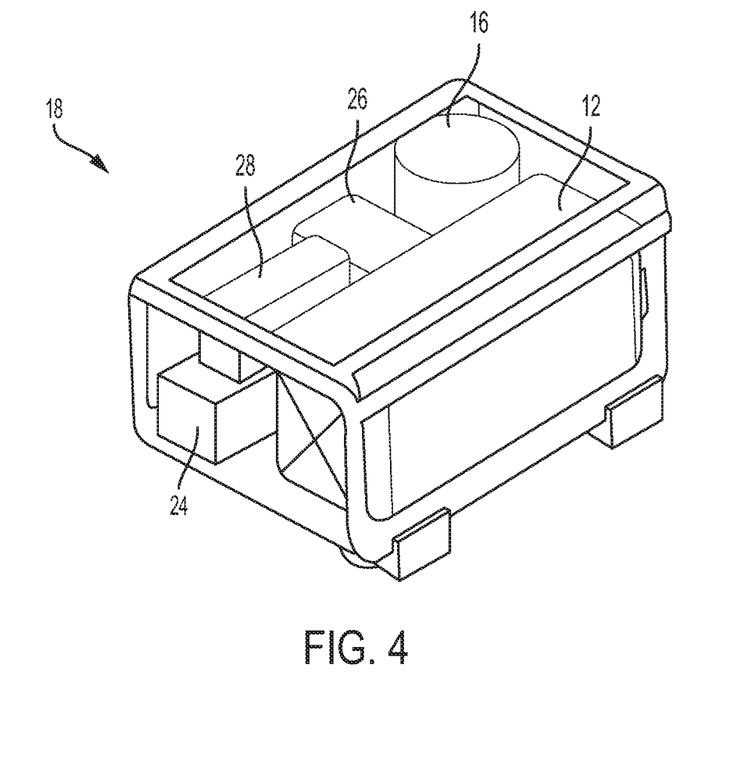
FIG. 4 shows a perspective view of non-deployed portable radar system, according to an embodiment.

As shown in FIG. 4, System 10 may be configured to break down such that it may fit into a backpack or similar, small space. As described above, each element may be collapsed or disassembled into smaller parts that are easy to pack and store. For example, enclosure 12 may be folded like fabric into a smaller volume shape. Mast 16 may be collapsed and coiled into a small roll. Tethers 20, if separate from enclosure 12, may be rolled and stored. Each may be placed into a backpack, crate, or other container that may be easily transported, such that portable radar system 10 may be quickly moved and deployed. In an embodiment, radar system 10, when stored, may weigh less than 45 lbs. In an embodiment, base 18 may form the backpack itself and may be comprised of a carbon fiber frame with canvas covers.

Figure 5:
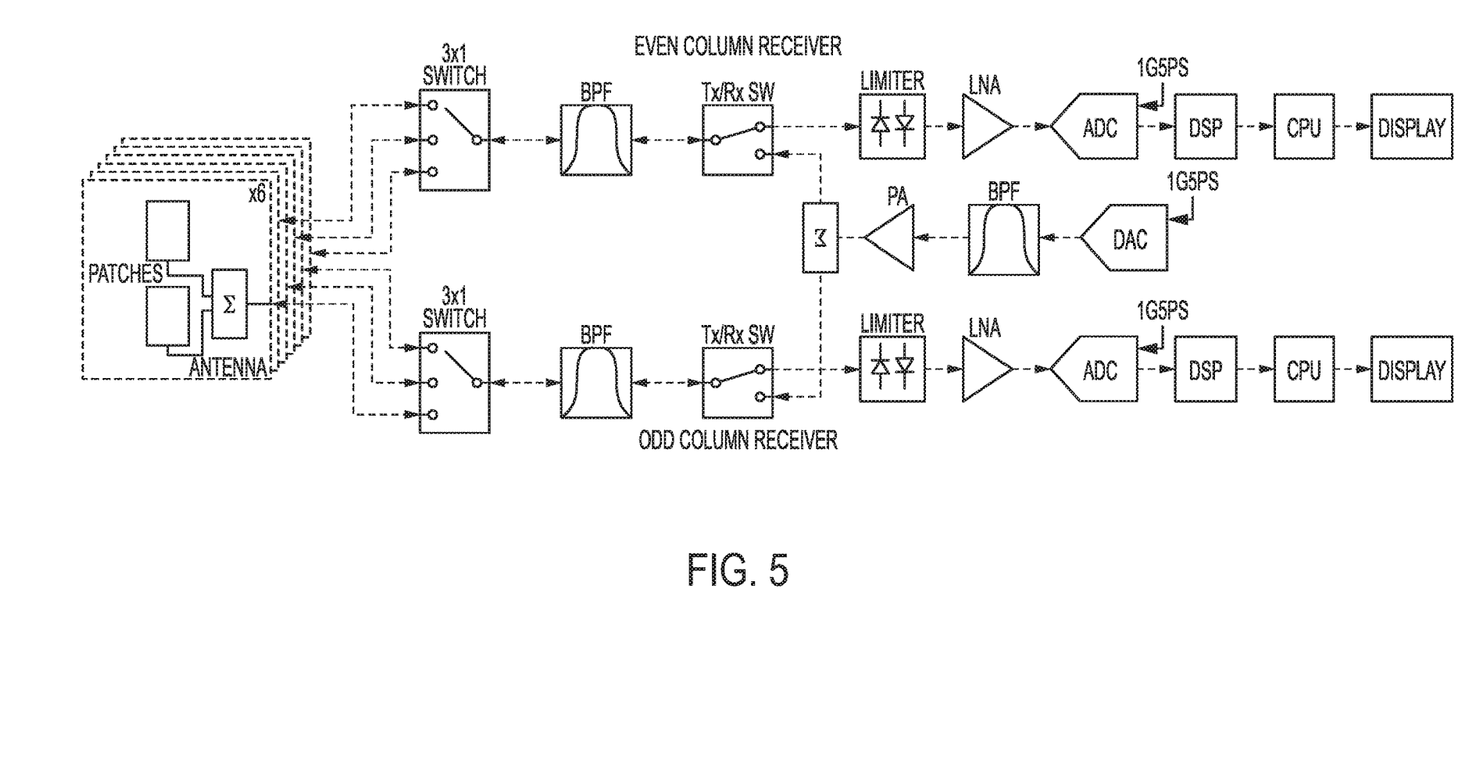
FIG. 5 shows a radar architecture, according an embodiment.

As shown in FIG. 5, in an embodiment, system 10 may operate in the UHF band (420-450 MHz) such that the radar can meet power-aperture requirements with very few radiating elements. In an embodiment, six columns may be operating (two per dwell) such that system 10 directly samples RF, thus eliminating beamforming and frequency conversion components. FIG. 5 shows an embodiment of radar electronics as may be implemented in system 10. In an embodiment, radar system 10 may be configured to provide a 5 km range on a 81 mm mortar, although in alternate embodiments, or in the same embodiment, radar system 10 may be configured to detect other objects such as aircraft, dismounts, and vehicles.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be an example and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

As will be appreciated by one skilled in the art, aspects of the present invention may be embodied/implemented as a computer system, method or computer program product. The computer program product can have a computer processor or neural network, for example, that carries out the instructions of a computer program. Accordingly, aspects of the present invention may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A portable radar system, when in a deployed state, comprising:
   a mast;
   a plurality of support elements, each support element being mounted at a first end to the mast and at a second end to a surface lower than the first end, each tether extending radially out from the mast such that the second end is positioned away from the mast, wherein each support element is a tether or a pole;
   a fabric enclosure being sized and dimensioned to be extendable in a covering relation with at least part of the mast, the fabric enclosure being arranged about the plurality of support elements to form a plurality of faces, each face being arranged between at least two of the support elements; and
   an antenna comprising at least one element, wherein said antenna is arranged on at least one face of the fabric enclosure such that the at least one element is positioned to illuminate and receive reflections from a target elevated with respect to the mast.

2. The portable radar system of claim 1, wherein the mast is collapsible.

3. The portable radar system of claim 2, wherein the mast is collapsible by rolling.

4. The portable radar system of claim 1, wherein the fabric enclosure defines a plurality of channels, each being sized to receive a respective support element of the plurality of support elements.

5. The portable radar system of claim 1, further comprising a plurality of outriggers, each of the plurality of outriggers extending radially from the mast.

6. The portable radar system of claim 5, wherein the plurality of outriggers each provide a surface for mounting a respective second end of each support element of the plurality of support elements.

7. The portable radar system of claim 1, wherein each plane of the plurality of faces is substantially trapezoidal.

8. The portable radar system of claim 1, wherein the fabric enclosure is substantially conical when in a covering relation with said mast.

9. The portable radar system of claim 1, further comprising a base configured to retain the mast in a substantially upright position.

10. The portable radar system of claim 1, wherein the at least one antenna element is arranged on the fabric enclosure as an eTextile.

11. The portable radar system of claim 1, further comprising a processor configured to receive signals received by the at least one antenna element.

* * * * *